United States Patent
Arafat et al.

(10) Patent No.: US 10,460,844 B2
(45) Date of Patent: Oct. 29, 2019

(54) SMALL NUCLEAR REACTOR CONTAINMENT SYSTEM

(71) Applicant: WESTINGHOUSE ELECTRIC COMPANY, LLC, Cranberry Township, PA (US)

(72) Inventors: Yasir Arafat, Pittsburgh, PA (US); Jurie Van Wyk, Cranberry Township, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 134 days.

(21) Appl. No.: 15/590,469

(22) Filed: May 9, 2017

(65) Prior Publication Data

US 2018/0330836 A1 Nov. 15, 2018

(51) Int. Cl.
| | |
|---|---|
| *G21C 13/02* | (2006.01) |
| *G21C 15/18* | (2006.01) |
| *G21C 15/12* | (2006.01) |
| *G21F 5/10* | (2006.01) |
| *G21F 5/008* | (2006.01) |
| *G21D 3/06* | (2006.01) |

(52) U.S. Cl.
CPC ............ *G21C 13/02* (2013.01); *G21C 15/12* (2013.01); *G21C 15/18* (2013.01); *G21F 5/008* (2013.01); *G21F 5/10* (2013.01); *G21D 3/06* (2013.01)

(58) Field of Classification Search
CPC ..... G21C 11/02; G21C 11/024; G21C 11/026; G21C 11/028; G21C 11/06; G21C 11/08; G21C 11/088; G21C 19/07; G21D 5/02; G21F 5/002; G21F 5/005; G21F 5/008; G21F 5/015; G21F 5/06; G21F 5/08; G21F 5/10

USPC ................................. 376/273, 274, 275, 276
See application file for complete search history.

(56) References Cited

U.S. PATENT DOCUMENTS

| | | | | |
|---|---|---|---|---|
| 3,111,586 | A | * | 11/1963 | Rogers .................... G21F 5/008 |
| | | | | 250/507.1 |
| 3,934,152 | A | * | 1/1976 | Alleaume ................. G21F 9/22 |
| | | | | 250/506.1 |
| 4,851,183 | A | | 7/1989 | Hampel |
| 8,625,732 | B2 | | 1/2014 | Singh |

(Continued)

FOREIGN PATENT DOCUMENTS

| | | |
|---|---|---|
| JP | H05264773 A | 10/1993 |
| JP | 2010217091 A | 9/2010 |

(Continued)

OTHER PUBLICATIONS

International Search Report and Written Opinion of the International Searching Authority for PCT/US2018/027419 dated Oct. 4, 2018 (Forms PCT/ISA/220, PCT/ISA/210, PCT/ISA/237).

*Primary Examiner* — Sharon M Davis
(74) *Attorney, Agent, or Firm* — Joseph C. Spadacene; Westinghouse Electric Company LLC (57) ABSTRACT

A nuclear reactor containment system including a nuclear reactor and a container enclosing the nuclear reactor. The container includes a number of heat removal systems each having an active state and an inactive state, wherein the heat removal systems dissipate heat from the container more efficiently in the active state than in the inactive state, and wherein the heat removal systems are structured to switch from the inactive state to the active state based on a temperature of the container.

17 Claims, 9 Drawing Sheets

(56) References Cited

U.S. PATENT DOCUMENTS

| | | | |
|---|---|---|---|
| 8,905,259 B2 | 12/2014 | Singh et al. | |
| 9,047,996 B2 | 6/2015 | Agace | |
| 9,293,229 B2 | 3/2016 | Singh et al. | |
| 9,396,824 B2 | 7/2016 | Agace | |
| 2006/0006351 A1* | 1/2006 | Timpert | G21F 5/08 250/506.1 |
| 2009/0207963 A1* | 8/2009 | Van Uitert | G21C 1/32 376/402 |
| 2010/0084403 A1* | 4/2010 | Popish | B65D 25/2858 220/318 |
| 2010/0272225 A1 | 10/2010 | Singh | |
| 2011/0241144 A1 | 10/2011 | Spencer et al. | |
| 2014/0177775 A1* | 6/2014 | Loewen | G21F 5/008 376/272 |
| 2014/0219411 A1* | 8/2014 | Dederer | G21C 15/18 376/299 |
| 2014/0270042 A1* | 9/2014 | Dederer | G21C 19/07 376/272 |
| 2014/0321597 A1 | 10/2014 | Singh et al. | |
| 2015/0006705 A1 | 1/2015 | Antony | |
| 2015/0076161 A1 | 3/2015 | Singh et al. | |
| 2016/0027536 A1 | 1/2016 | McClure et al. | |
| 2017/0125132 A1* | 5/2017 | Takeda | G21C 19/04 |
| 2018/0130566 A1* | 5/2018 | Hida | G21F 9/36 |

FOREIGN PATENT DOCUMENTS

| | | |
|---|---|---|
| JP | 2015031523 A | 2/2015 |
| WO | 2011011504 A1 | 1/2011 |
| WO | 2013155520 A1 | 10/2013 |

\* cited by examiner

SMALL NUCLEAR REACTOR CONTAINMENT SYSTEM

BACKGROUND

1. Field

The disclosed concept pertains generally to containers and, more particularly, to a container for a small nuclear fission reactor or battery.

2. Related Art

Climate change is often perceived as the largest threat to the world's economy. As a result, clean technologies such as nuclear and renewables are being thoroughly reinvestigated and reinvented as power generators in markets that were previously underserved by these technologies. In addition, with the advent and growth of the decentralized power generation market, very small (less than 10 MW-thermal) nuclear generation devices seem more plausible as a reliable, sustainable, flexible, secure, resilient and affordable power generator. These small nuclear reactors are perceived to be built, assembled, tested and certified in factories rather than on site and then transported to where they can be deployed. The packaging of the reactor in a multipurpose canister (MPC) for safe and secure transportation and on site residence of these reactors is key to their practical deployment and licensing.

Small nuclear reactors or nuclear batteries usually are not designed to undergo refueling like the traditional nuclear power plants. In most cases, the containment is not breached on customer's site at all and there is no traditional refueling. These reactors or batteries are designed for a long life cycle which can range from 5-60 years, depending on the technology, design, and customer needs. At the end of the fuel cycle, the MPC is disconnected and swapped with a new unit. The used reactor is transported back to the fabrication/processing/manufacturing facility for post operational activities which may include recycling of parts, fuel removal/retrieval, reuse processing, or direct disposal. These reactors should have a very high level of safety, be robust enough to withstand external threats, and be proliferation resistant. The MPC of the nuclear reactor plays a large role in all of these factors.

Spent nuclear fuel is often stored in dry storage containers, either in casks or canisters. Casks include concrete lining with conductive fins to dissipate the heat to the outside, while canisters are metal containers with finned channels to dissipate the heat to the surrounding. Sometimes, canisters are placed inside a cask for additional shielding and protection while storing used fuel above the ground. Similarly, the same canister can be retrofitted with impact limiters during transportation. A canister with multiple functions is often called an MPC. MPCs usually have robust designs that can provide the safety and security for storage of used nuclear fuel from light water reactors. For example, current used fuel MPCs are qualified rigorously such as dropping it from a 250 m height on a sharp edge, burning the MPC in oil fire for 3 hours at 1000° C. and firing at the MPC with a ballistic missile. These rigorous qualification tests ensure spent fuel is safe and secure inside the cask or canister in the worst possible attacks: physical or environmental.

While MPCs have been adapted for use in containment of used nuclear fuel, storage, and transport, containment of small nuclear reactors or batteries presents challenges that differ from containment of used nuclear fuel. There is a need to develop a containment system for small battery type nuclear reactors.

SUMMARY

In accordance with an embodiment of this concept, a nuclear reactor containment system includes: a nuclear reactor; and a container enclosing the nuclear reactor, the container including: a number of heat removal systems each having an active state and an inactive state, wherein the heat removal systems dissipate heat from the container more efficiently in the active state than in the inactive state, and wherein the heat removal systems are structured to switch from the inactive state to the active state based on a temperature of the container.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
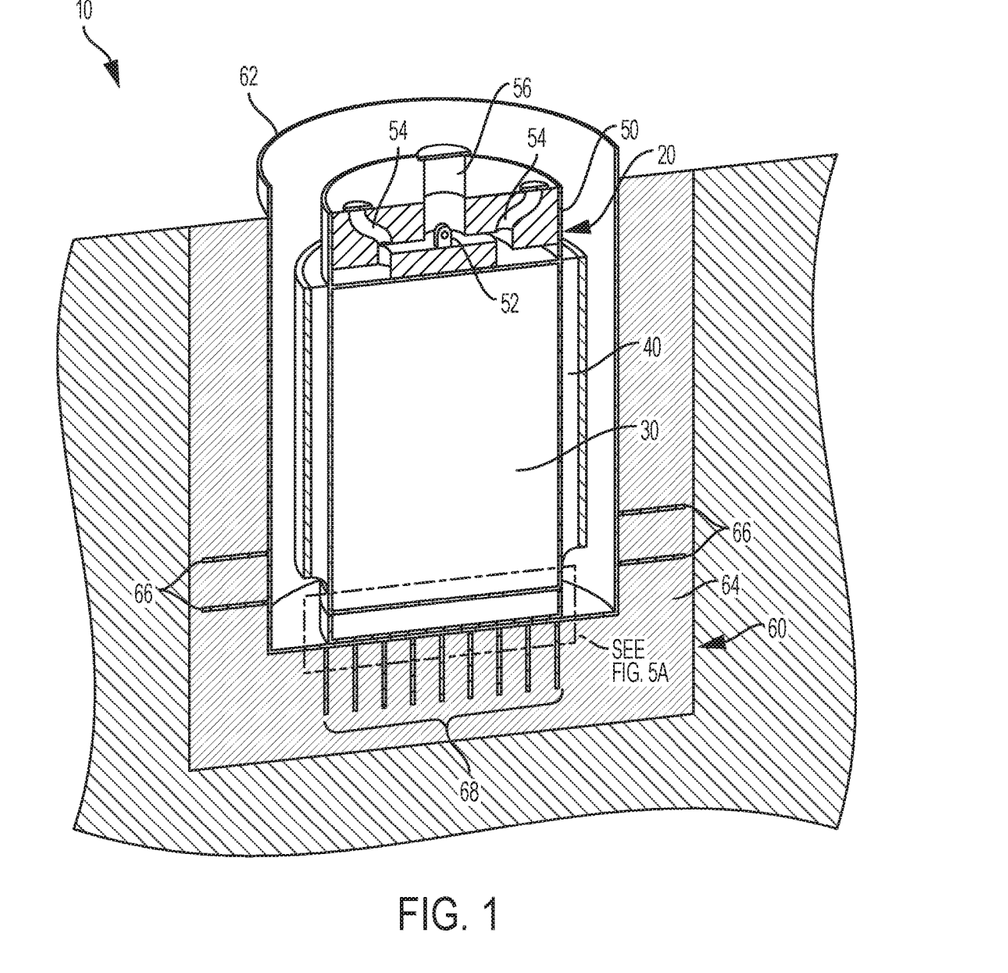
FIG. 1 is a perspective view of a nuclear reactor containment system in accordance with an example embodiment of the disclosed concept.
Figure 2:
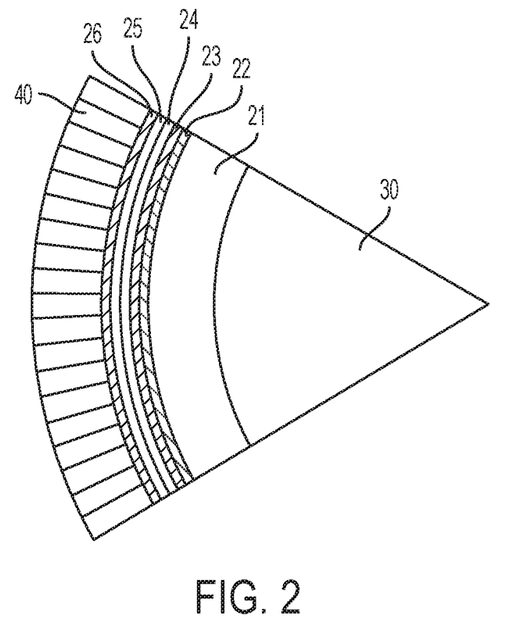
FIG. 2 is a sectional view of a container in accordance with an example embodiment of the disclosed concept.

FIG. 1 is a cross-sectional view of an underground installation 10 including an installed container 20 in accordance with an example embodiment of the disclosed concept. The vertical cross-sectional view shown in FIG. 1 illustrates the container 20. FIG. 2 is a cross-sectional view of a portion of the container 20 in accordance with an example embodiment of the disclosed concept. The cross-sectional view shown in FIG. 2 illustrates a top view of a cross-section of a portion of the container 20.

A nuclear reactor 30 is contained within the container 20. The container 20 provides for safe and secure containment for the nuclear reactor 30 during both transportation and installed operation. The container 20 generally provides the functions of containment, radiation shielding, protection, monitoring, and a heat removal interface between the nuclear reactor 30 and a heat sink. Additionally, to facilitate normal operation, the container 20 includes two independent and redundant passive decay heat removal systems. Similarly, the container 20 provides the functions of physical protection, radiation shielding, heat removal, and condition monitoring during transport.

To facilitate containment, the container 20 is a multi-layered canister that acts as a barrier between the radioactive contents of the nuclear reactor 30 and the environment. The container 20 is leak tight to water, but able to breathe without allowing radioactive material to leak. Referring to FIG. 2, in some example embodiments of the disclosed concept, the nuclear reactor 30 is located in the innermost portion of the container 20. A number of layers a disposed around the nuclear reactor 30. Starting from the innermost layer around the nuclear reactor 30 and working outward, the layers include a neutron reflector 21, a stainless steel wall 22, a neutron absorber 23, another stainless steel wall 24, a gamma shield 25, and a container vessel wall 26. The outermost portion of the container 20 includes a fin assembly 40 that is used to dissipate heat to air.

The various layers provide containment and radiation shielding. In some example embodiments of the disclosed concept, the gamma shield 25 is comprised of lead, stainless steel, or other gamma absorbers. The gamma shield 25 prevents activation of the container vessel wall 26 and the fin assembly 40. In some example embodiments of the disclosed concept, the neutron absorber 23 is comprised of boron absorber material such as, for example and without limitation, boron carbide. The neutron absorber 23 prevents neutrons from leaving the container 20. A neutron absorber 23 comprised of boron carbide also adds to the ballistic protection of the container 20. In some example embodiments of the disclosed concept, the neutron reflector 21 is comprised of alumina. When the nuclear reactor 30 is a fast reactor, the neutron reflector 21 may be used to ensure that most neutrons do not leave the nuclear reactor 30. It will be appreciated that the neutron reflector 21 may be omitted without departing from the scope of the disclosed concept. It will also be appreciated that other layers may be omitted or that the order of the layers may be changed, or some layers may become part of the nuclear reactor 30, without departing from the scope of the disclosed concept.

In some example embodiments of the disclosed concept, the container vessel wall 26 and portions of the fin assembly 40 such as its outer wall may be comprised of steel. Steel provides robustness that assists in preventing external damage due to events such as, for example, natural disaster, external explosives, or attempts to retrieve radioactive material. Various other components of the container 20 may also be comprised of steel or other robust materials. In some example embodiments of the disclosed concept, surfaces of the container 20 may be treated by, for example, annealing or other methods of coating to reduce or prevent corrosion or rusting during the lifetime of the nuclear reactor 30. Insulation or insulating materials may be used on the exterior of the curved surface of the fins 40.

The container 20 additionally includes a lid 50. The lid 50 is a thick radiation shield top lid that acts as a physical (shock absorber) and radiation barrier. As shown in FIG. 1, the container 20 is installed in an underground vault 60. When the container 20 is installed below grade in the underground vault 60, the lid 50 acts as security measure that prevents unauthorized access to the underground nuclear reactor 30. The lid 50 also includes one or more removable lifting lugs 52 that can be used as attachment points when removing the container 20 from the underground vault 60. The lid 50 may be secured using electronic security systems or physical locks that be opened in the factory. The lid 50 also includes power conversion heat connections 54 that allow connection to systems that convert heat generated by the nuclear reactor 30 to power. The lid 50 also includes an outlet air chimney 56 to exhaust the heated air from the fin assembly 40.

The container 20 may be installed in the underground vault 60. The underground vault 60 includes a housing 62 structured to receive the container 20. A barrier area 64 is disposed in the ground around the sides and bottom of the housing 62. The barrier area 64 may be formed of, for example, concrete. Side fins 66 and bottom fins 68 may extend from the sides and bottom of the housing 64, respectively, into the barrier area 64. The side and bottom fins 66,68 assist with dissipating heat from the container 20 into the surrounding barrier area 64, and eventually to ground.

In some example embodiments of the disclosed concept, the container 20 includes one or more sensors (not shown) that monitor the condition of and potential threats to the container 20. Conditions and potential threats may include temperature, pressure, acceleration, radiation, flooding, fire, position (GPS), impact, and tampering. For example, the sensors may include sensors for monitoring conditions such as radiation, moisture, temperature, pressure, acceleration, flooding, fire, position (GPS), impact, tampering, visual imaging, and other conditions. The container 20 may also include communication equipment (not shown) capable of transmitting and receiving information. For example, the communication equipment may be capable of wirelessly transmitting and receiving information gathered by the sensors to electronic devices external to the container 20 in a secure manner. The transmitting and receiving equipment may also be capable of transmitting and receiving the information from the sensors in a wired manner. The communication equipment may also be capable of transmitting and receiving the information gathered by the sensors via the a network, such as the internet, in a secure manner. In some example embodiments of the disclosed concept, the communication equipment may be integrated into the sensors. In some example embodiments of the disclosed concept, the one or more of the sensors may include logic that can start or stop sensing of measurements based on information received via the communication equipment. In some example embodiments of the disclosed concept, the one or more of the sensors may capture and store sensed data. Also, in some example embodiments of the disclosed concept, the sensors and/or communication equipment may be self-powered.

In some example embodiments of the disclosed concept, the container 20 includes one or more actuation devices (not shown) that initiate an action inside the container 20. For example and without limitation, the actuation devices may actuate to causes actions such as a change in operation mode or condition of the nuclear reactor 30, activating security devices, activating protection, activating or changing power conversion systems, or activating or changing energy flow of heat exchangers. The container 20 may also include communication equipment (not shown) capable of transmitting and receiving status or status change information of actuation devices. For example and without limitation, the communication equipment may be capable of wirelessly transmitting to and receiving information from electronic devices external to the container 20 in a secure manner. The communication equipment may also be capable of transmitting and receiving the information from the actuator in a wired manner. The communication equipment may also be capable of transmitting and receiving information gathered from the actuation devices via the internet. In some example embodiments of the disclosed concept, the communication equipment may be integrated into the one or more of the actuation devices. Also, in some example embodiments of the disclosed concept, the actuation devices may include logic that can initiate or stop actuations based on information received via the communication equipment. Also, in some example embodiments of the disclosed concept, the actuation devices may capture and store actuation data. Also, in some example embodiments of the disclosed concept, the actuation devices and/or communication equipment may be self-powered.

In some example embodiments of the disclosed concept, the container 20 includes two decay heat removal systems. The decay heat removal systems each have an active state and an inactive state. In the active state, the heat removal systems remove heat from the container 20 in a more efficient manner than when they are in an inactive state. In some example embodiments of the disclosed concept, the heat removal systems switch from the inactive state to the active state based on the temperature of the nuclear reactor. When the nuclear reactor 30 is in normal operation, it is preferable to have the heat removal systems in an inactive state so that the heat generated by the nuclear reactor 30 can be converted into power rather than being removed and dissipated to air by the fin assembly 40. However, when the nuclear reactor 30 is shut down or becomes overheated, it is preferable to switch the heat removal systems to the active state so that they can remove and dissipate heat from the nuclear reactor 30 more efficiently.

Figure 3A:
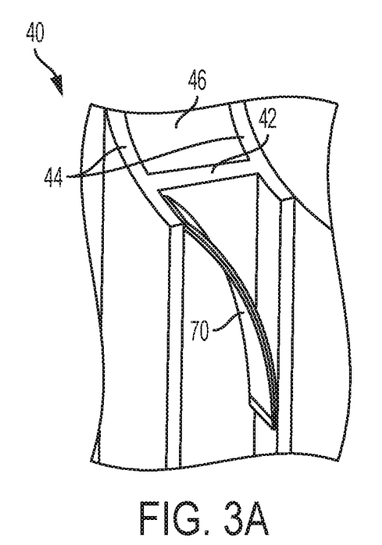
FIGS. 3A and 3B are perspective views of a first heat removal system in accordance with an example embodiment of the disclosed concept.
Figure 3B:
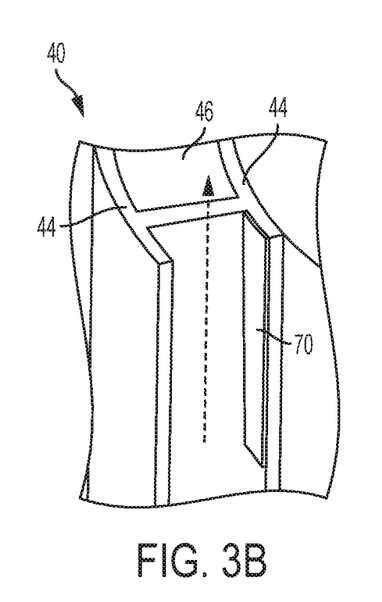

The first heat removal system includes the fin assembly 40. FIG. 3A is an isometric view of a portion of the fin assembly 40 in the inactive state in accordance with an example embodiment of the disclosed concept. FIG. 3B is an isometric view of the fin assembly 40 in the active state in accordance with an example embodiment of the disclosed concept. The fin assembly 40 includes fins 42 enclosed in an insulated sheath 44 to form vertical convection cooling channels 46. Air enters the channels 46 via inlets at the lower ends of the channels 46 and flows through the channels to exit the channels through outlets at their upper ends.

The fin assembly 40 includes airflow regulating mechanism that is capable of changing between the inactive state and the active state. In the inactive state, airflow is prevented from proceeding through the channels 46 and through the outlet by the airflow regulating mechanism. In the active state, airflow is allowed to proceed through the channels 46 and through the outlet. In one example embodiment of the disclosed concept shown in FIGS. 3A and 3B, the airflow regulating mechanism is a bimetallic strip 70. A bimetallic strip 70 is disposed in each one of the channels 46. The bimetallic strip 70 is structured to be bent so that is blocks airflow in the channel 46 at temperatures corresponding to normal operation of the nuclear reactor 30, as is shown in FIG. 3A. The state shown in FIG. 3A is the inactive state of the fin assembly 40. As the temperature rises above normal operating temperatures of the nuclear reactor 30, the bimetallic strip 70 bends from its resting position so that it allows airflow through the channel 46, as is shown in FIG. 3B. The state shown in FIG. 3B is the active state of the fin assembly 40. In this manner, the bimetallic strip 70 is able to change the state of the fin assembly 40 from the inactive state to the active state based on the temperature of the container 20.

Figure 4A:
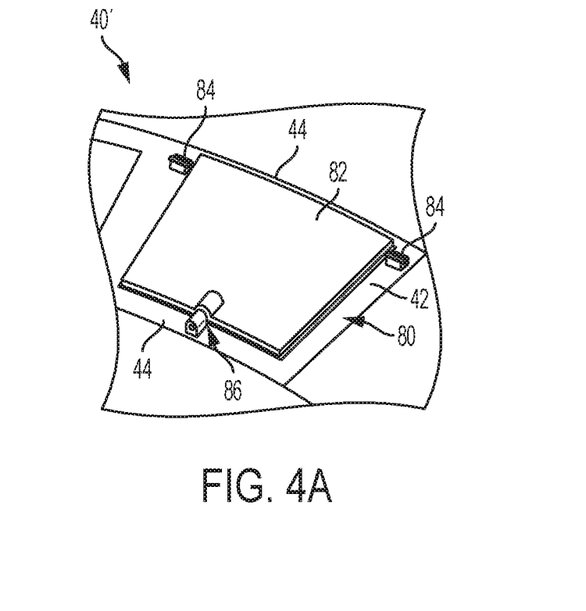
FIGS. 4A and 4B are perspective views of a first heat removal system in accordance with another example embodiment of the disclosed concept.
Figure 4B:
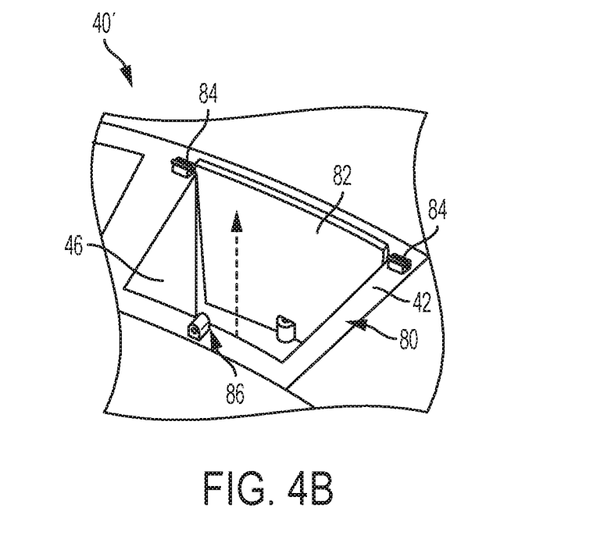

FIGS. 4A and 4B show a fin assembly 40' including an airflow regulating mechanism in accordance with another example embodiment of the disclosed concept. The airflow regulating mechanism shown in FIGS. 4A and 4B is an opening plate assembly 80. The opening plate assembly 80 includes a plate 82 disposed over each of the channels 46. In the inactive state, the plate 82 is supported over the channel 46 by pivots 84 and a fusible link 86. The fusible link 86 includes a melting element. The melting element of the fusible link 86 is structured to remain solid and support the plate at temperatures corresponding to normal operation of the nuclear reactor 30, as is shown in FIG. 4A. The state shown in FIG. 4A is the inactive state of the fin assembly 40' in which the plate 82 blocks airflow out of the channel 46. As the temperature rises above normal operating temperatures of the nuclear reactor 30, the melting element of the fusible link 86 melts. This causes the fusible link 86 to stop supporting the plate 82. At this point, the plate 82 is able to rotate about the pivots 84 and drop into the channel 46 as shown in FIG. 4B. The state shown in FIG. 4B is the active state of the fin assembly 40' in which the plate 82 no longer blocks airflow out of the channel 46. The melting element may be a selected material that has a predetermined melting point that is above the normal operating temperatures of the nuclear reactor 30. Examples of materials that can be used for the fusible link 86 may include, without limitation, tin-bismuth. However, it will be appreciated that other materials may be used without departing from the scope of the disclosed concept. It will also be appreciated that materials may be selected based on the desired activation temperature.

In another example embodiment of the disclosed concept, a plate similar to the plate 82 may block the airflow out of the channel. However, instead of employing a fusible link 86 with a melting element, the plate itself may be composed of a melting material such that the plate blocks airflow at temperatures corresponding to normal operation of the nuclear reactor 30. The plate then melts when the temperature rises above the normal operating temperature of the nuclear reactor 30, thus allowing airflow out of the channel 46.

In another example embodiment of the disclosed concept, a plate similar to the plate 82 may be kept closed with an electromagnetic field induced via electromagnetic coil. However, instead of employing a fusible link 86 with a melting element, an electromagnetic coil can be used to keep the plate 82 in position to block airflow during normal operation. When the temperature increase beyond temperatures corresponding to normal operation of the nuclear reactor 30, the resistance in the conductor of the coil or to the coil will cause the current to reduce which, in turn, will cause the strength of the electromagnetic field to be reduced. Due to the reduced strength of the electromagnetic field, the plate 82 will be released to allow airflow through the channel 46.

The temperature at which the first heat removal system switches from the inactive state to the active state may be a selected temperature above the temperature of the container 20 when the nuclear reactor 30 is operating normally. During reactor shutdown, if heat is not removed via the fin assembly 40, the container 20 temperature will rise. Examples of container 20 temperatures when the activation of decay heat removal is desirable are, without limitation, about 100-300° C.

The first heat removal system of the container 20, examples of which are shown and described with respect to FIGS. 3A, 3B, 4A, and 4B, is structured to remove heat of the nuclear reactor 30 to air. The second heat removal system, which will be described in more detail hereinafter, is structured to remove heat from the nuclear reactor 30 to ground.

Figure 5A:
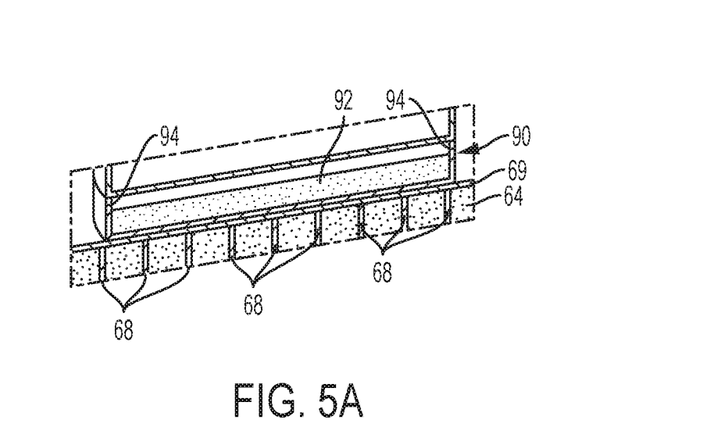
FIGS. 5A and 5B are perspective views of a second heat removal system in accordance with an example embodiment of the disclosed concept.
Figure 5B:
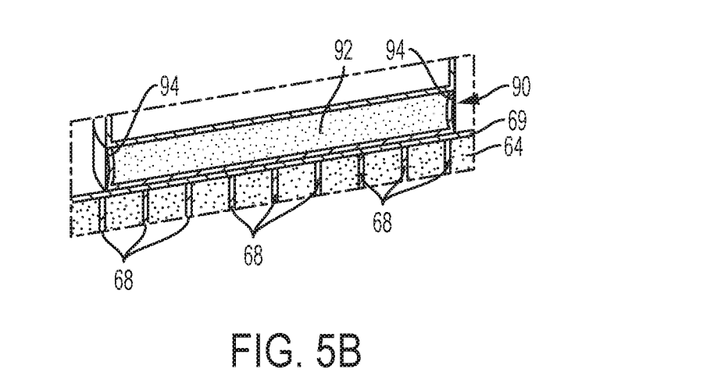

FIGS. 5A and 5B are perspective views of a second heat removal system in accordance with an example embodiment of the disclosed concept. In this embodiment there is a chamber 90 on the container 20. The chamber 90 is in contact with a heat spreader base plate 69 which, in turn is in contact with the bottom plates 68 that extend into the barrier area 64. The chamber 90 contains flexible liner having a thermally conducting fluid 92 disposed therein. In some example embodiments of the disclosed concept, the thermally conducting fluid 92 may be comprised of lead, tin, bismuth, aluminum, an alloy of these materials, or other fluid with high thermal conductivity. The thermally conducting fluid 92 may be contained within a flexible container. The chamber 90 further contains bimetallic plates 94 disposed along the sides of the chamber 90. It will be appreciated that the bimetallic plates 94 may be disposed at other locations within the chamber 90 without departing from the scope of the disclosed concept.

The inactive state of the second heat removal system is shown in FIG. 5A. As shown in FIG. 5A, the thermally conducting fluid 92 does not reach the top of the chamber 90 and does not create a thermal bridge from the top of the chamber 90 to the heat spreader base plate 69. The inactive state of the second heat removal system corresponds to temperatures at which the nuclear reactor 30 is operating normally. As the temperature rises, the bimetallic plates 94 begin to bend inward, which reduces the volume inside the chamber 90 and causes the thermally conducting fluid 92 to fill the reduced volume and contact the top of the chamber 90.

The active state of the second heat removal system is shown in FIG. 5B. As shown in FIG. 5B, the bimetallic plates 94 have bent inward and caused the thermally conducting fluid 92 to contact the top of the chamber. In the active state, the thermally conducting fluid 92 creates a thermal bridge between the top of the chamber 90 and the heat spreader base plate 69 and allows heat from the nuclear reactor 30 to be more efficiently dissipated to ground. The temperature at which the second heat removal system switches from the inactive state to the active state may be a selected temperature above the temperature of the container 20 when the nuclear reactor 30 is operating normally.

In some example embodiments of the disclosed concept, instead of using thermally expanding metals, such as the bimetallic plates 94, other expanding gasses, liquids, or solids may be utilized to cause the thermally conducting fluid 92 to rise to contact the top of the chamber 90 and form the thermal bridge. In these types of example embodiments of the second heat removal system, the transition from the inactive state to the active state is reversible. That is, as the bimetallic plates 94 (or other expanding material) cools, the bimetallic plates 94 will revert to their shape shown in FIG. 5A and contact between the top of the chamber 90 and the thermally conducting fluid 92 will be broken.

Figure 6:
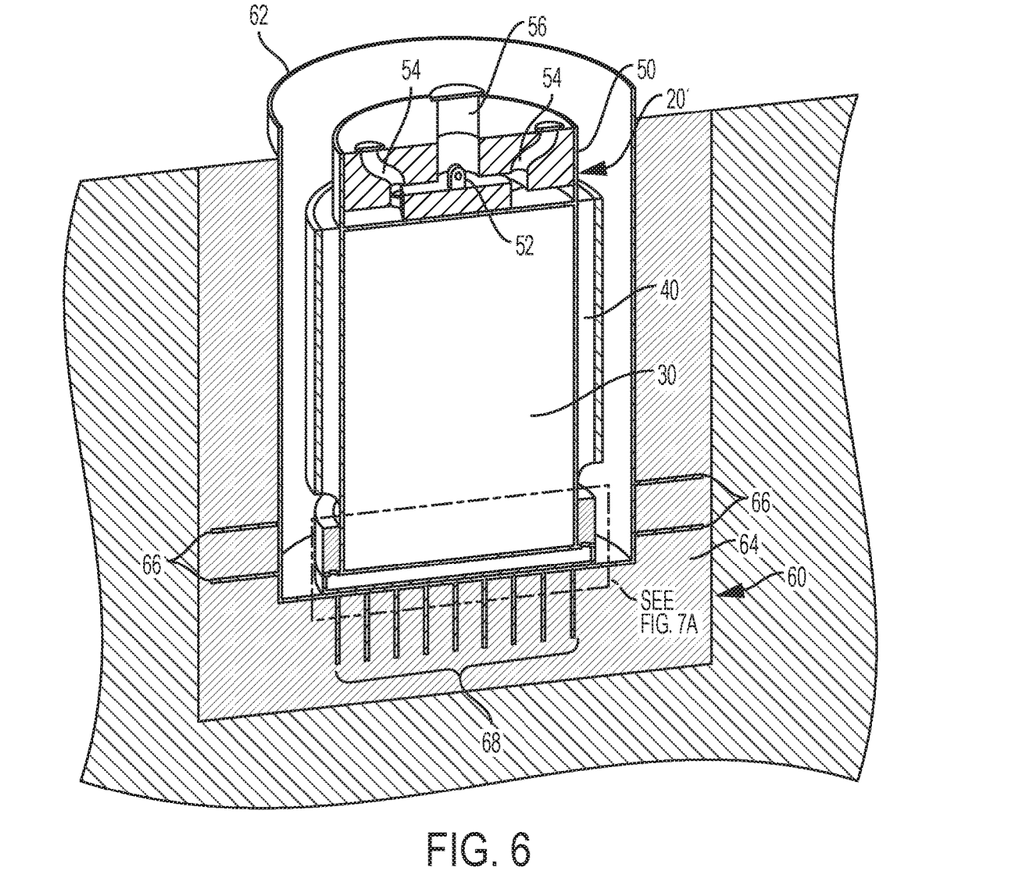
FIG. 6 is a perspective view of a nuclear reactor containment system in accordance with another example embodiment of the disclosed concept.
Figure 7A:
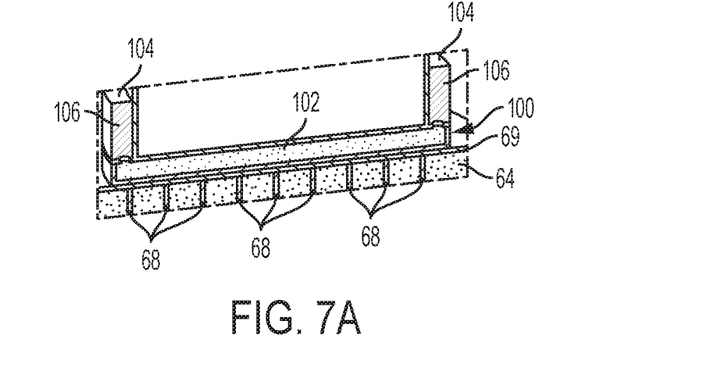
FIGS. 7A and 7B are perspective views of a second heat removal system in accordance with another example embodiment of the disclosed concept.
Figure 7B:
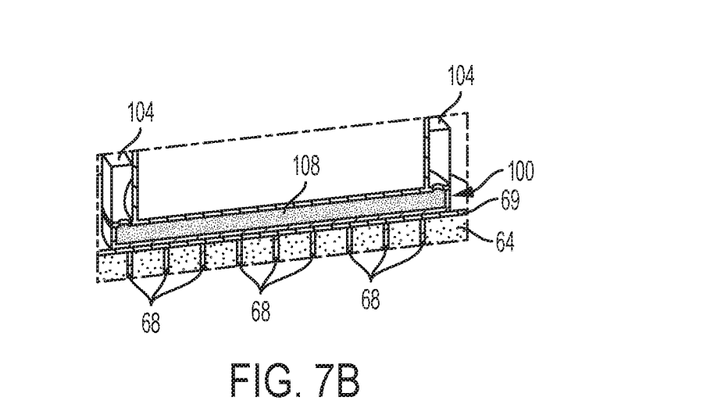

FIG. 6 shows a container 20' including a second heat removal system in accordance with another example embodiment of the disclosed concept. FIGS. 7A and 7B are perspective views of the second heat removal system shown in FIG. 6. In the present embodiment, the second heat removal system includes a primary chamber 100 disposed at the bottom of the container 20. A secondary chamber 104 is disposed above the primary chamber 100 around the outer perimeter of the container 20. A first material 102 is disposed in the primary chamber 100 and a second material 106 is disposed in the secondary chamber 104.

In some example embodiments, the first material 102 is a solid porous material (e.g., 30-80% porosity) such as metal or ceramic. In some example embodiments, the second material 106 is a metal or alloy formed in small chips, spheres, or powder. The second material 106 has a lower melting point than the first material 102. The primary chamber 100 and the secondary chamber 104 are separated by a mesh or screen so that when the second material 106 melts, it flows into the primary chamber 100. Once the second material 104 flows into the first material 102 in the primary chamber 100, the resultant composite material 108 has a higher thermal conductivity than the first material 102 alone and creates a thermal bridge between the container 20 and the heat spreader base plate 69.

As shown in FIG. 7A, the second heat removal system is in the inactive state. In the inactive state, the second material 106 has not yet melted and is disposed in the secondary chamber 104. FIG. 7B shows the second heat removal system in the active state. In the active state, the second material 106 has melted and flowed into the primary chamber 100 resulting in a composite material 108, formed from the first and second materials 102, 106, being disposed in the primary chamber 100. The temperature at which the second heat removal system switches from the inactive state to the active state (e.g., the temperature at which the second material 106 melts) may be a selected temperature above the temperature of the container 20 when the nuclear reactor 30 is operating normally. The second heat removal system shown in FIGS. 7A and 7B is cannot revert back to the inactive state after the second material 106 has melted.

Figure 8:
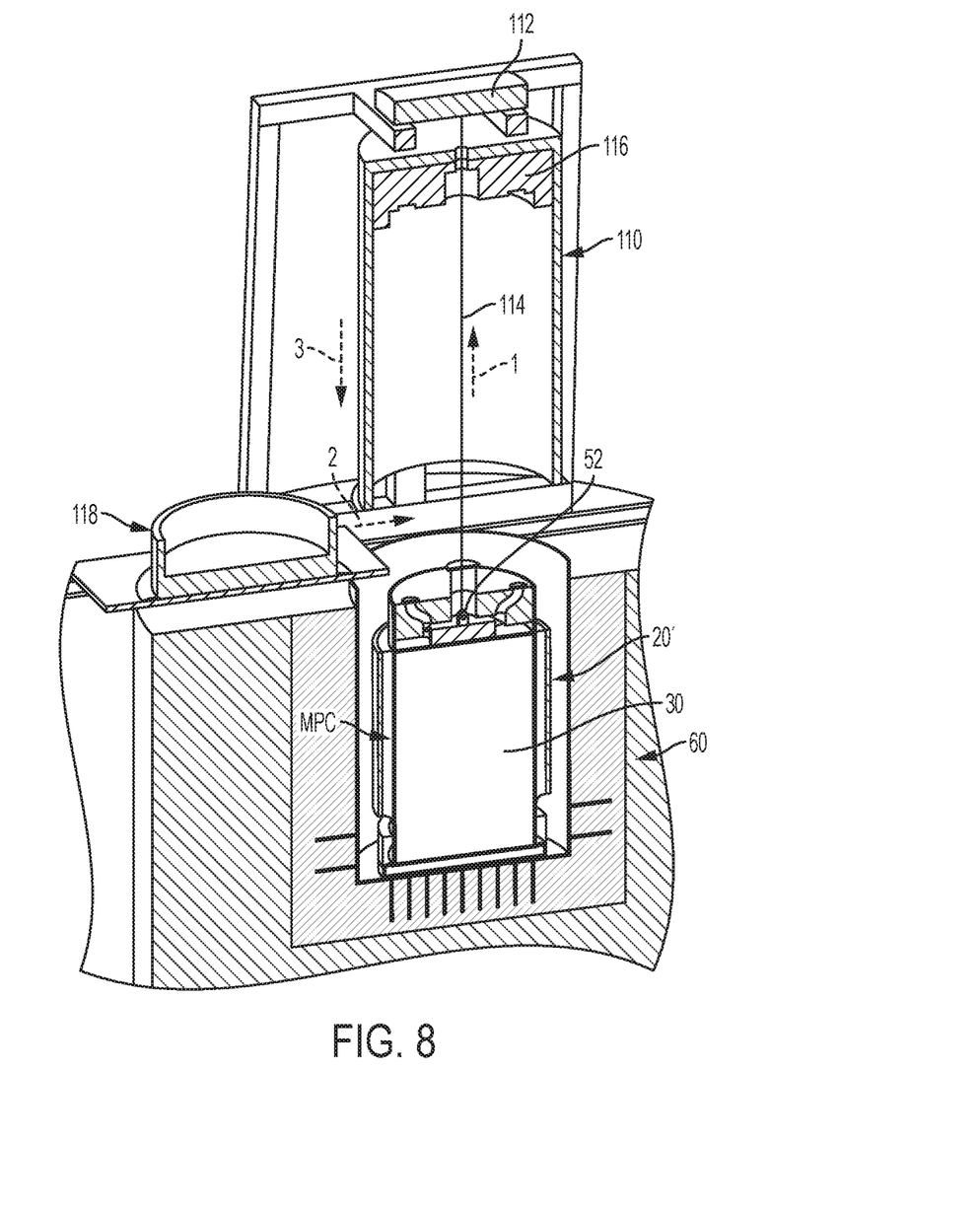
FIG. 8 is a perspective view of a container in the process of being removed from an underground vault in accordance with an example embodiment of the disclosed concept.

FIG. 8 is a diagram of a process for removing the container 20' from the underground vault 60. First, reactor shutdown systems are turned to secure shut down mode so that no moving or shock can activate the nuclear reactor 30. The power conversion system and other heat removal systems may also be used to speed up the nuclear reactor's 30 cool down process. Then, cabling and piping for the power conversion process are disengaged. A secured lid covering the underground vault 60 may be opened once the cabling and piping are disengaged. Shielding is integrated into the top of the container 20' to minimize radiation shine to the outside.

To remove the container 20' and prepare it for transport, a cask 110 is placed over the underground vault 60. A lifting crane 112 and associated lifting cable 114 may be used to raise the container 20' out of the underground vault 60 and into the cask 110. The cask 110 may also include an integrated top impact limiter 116 formed in its top portion to limit the amount of impact to the container 20' while in the cask 110. Once the container 20' is raised into the cask 110, a bottom lid 118 with an integrated impact limiter is slid under the cask 110. The bottom lid 118 is attached to the bottom of the cask 110 to enclose the container 20' inside the cask 110. The bottom lid 118 may rest on a shield plate that provides shielding from residual radiation from inside the underground vault 60 and also provides a platform for workers.

Figure 9:
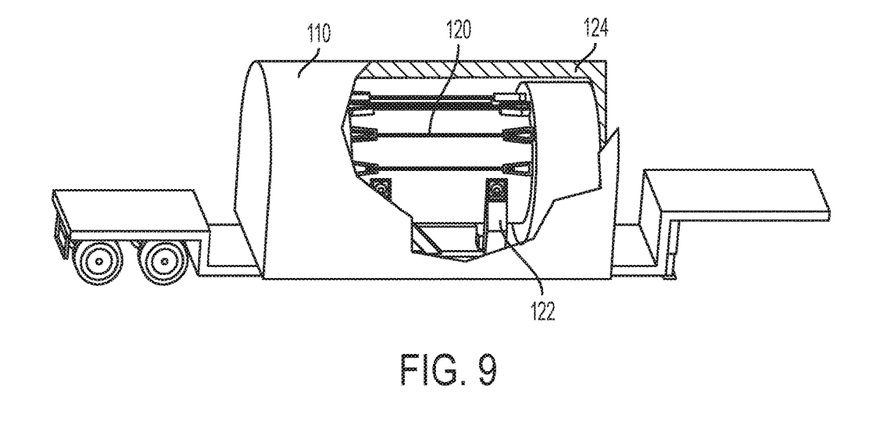
FIG. 9 is a view of a container loaded into a cask during transport in accordance with an example embodiment of the disclosed concept.

The container 20' may be secured in the cask 110 using an impact limiter harness 120 that spans between impact limiters at the top and bottom portions of the cask 110, as is shown in FIG. 9. A base support 122 may also be used to secure the container 20' in the cask 110. In some example embodiments, the interior of the cask 110 may include ballistic and/or radiation shielding material 124. Once the container 20' is secured in the cask 110, the cask 110 may be horizontally loaded on a truck or other transport device, as is shown in FIG. 9. The cask 110 including the container 20' may then be transported, for example, to a factory for recycling parts, extracting used fuel, and disposing of activated/contaminated parts.

Installing a new container 20' in the underground vault 60 is basically the reverse of the process of removing the container 20' from the underground vault. The container 20' arrives at the site secured in the cask 110 on a truck. The cask 110 is placed over the underground vault 60 and the container 20' is attached to the lifting cable 114. Mechanisms to secure the container 20' in the cask 110 are removed and the bottom lid 118 is separated from the container and slid away from the upper opening of the underground vault 60. The container 20' may then be lowered into the vault 60. The container 20' may be connected to the power conversion system and the secured lid of the vault 60 may be closed. Swapping a used container 20' for a new container 20' is a quick task and can be accomplished within 24 hours.

In transport, as is shown for example in FIG. 9, the cask 110 and container 20' provide physical protection, radiation shielding, decay heat removal, and condition monitoring. For physical protection, the cask 110 provides additional protection. The cask 110 may be comprised of concrete and include impact limiters or shock absorbers. The interior of the cask 110 may be comprised of ballistic and/or radiation shielding material 124 such as, without limitation, alumina or boron carbide. Impacts limiters filled with shock absorbing materials such as wood chips or engineered products may be integrated into the cask 110.

In some example embodiments of the disclosed concept, the cask 110 is made of concrete, which provides gamma shielding. In some example embodiments of the disclosed concept, the ballistic and/or radiation shielding material 124 is boron carbide, which provides additional shielding for neutrons. In some example embodiments of the disclosed concept, the cask 110 includes fins integrated into its construction which conduct heat away from the container 20'. In some example embodiments of the disclosed concept, air passages are formed in the cask 110 to allow passive or active ventilation inside the cask 110 to remove heat. The cask 110 may also include condition monitoring and tracking equipment. The condition monitoring and tracking equipment may include, for example, radiation, moisture, temperature, pressure, acceleration, and/or visual imaging sensing equipment. The cask 110 may also include equipment for storing, transmitting, and protecting sensed data.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:
1. A nuclear reactor containment system comprising:
   a nuclear reactor;
   a container enclosing the nuclear reactor, the container including:
      at least one heat removal system having an active state and an inactive state, wherein the at least one heat removal system dissipates heat from the container more efficiently in the active state than in the inactive state, and wherein the at least one heat removal system is structured to switch from the inactive state to the active state based on a temperature of the container,
   wherein the at least one heat removal system includes a first heat removal system including:
      fins disposed in an outer portion of the container and forming a plurality of cooling channels; and
      a plurality of air regulating mechanisms structured to block air from flowing through the cooling channels when the first heat removal system is in the inactive state and to allow air to flow through the cooling channels when the first heat removal system is in the active state,
   wherein at least one of the air regulating mechanisms includes:
      a first plate structured to be disposed over a first cooling channel of the plurality of cooling channels to block airflow through the first cooling channel;
      a pivot structured to support a first side of the first plate;
      an electromagnetic element structured to support a second side of the first plate via an electromagnetic force and being structured to support the second side of the first plate via the electromagnetic force at a predetermined temperature,
   wherein when the first heat removal system is in the inactive state, the electromagnetic element supports the second side of the first plate and the first plate blocks airflow through the first cooling channel, and
   wherein when the first heat removal system is in the active state, the electromagnetic element melts and allows the second side of the plate to fall into the first cooling channel and allow airflow through the first cooling channel.

2. The nuclear reactor containment system of claim 1, wherein the at least one heat removal system is structured to switch from the inactive state to the active state at one or more predetermined temperatures of the container above temperatures of the container corresponding to normal operation of the nuclear reactor.

3. The nuclear reactor containment system of claim 1, wherein at least one of the air regulating mechanisms includes:
   a bimetallic strip disposed in a second cooling channel of the plurality of cooling channels, the bimetallic strip being structured to bend based on temperature,
   wherein the bimetallic strip is structured to be bent in a direction to block airflow in the second cooling channel when the first heat removal system is in the inactive state and to be bent in a direction to allow airflow through the second cooling channel when the first heat removal system is in the active state.

4. The nuclear reactor containment system of claim 1, wherein at least one of the air regulating mechanisms includes:
   a second plate structured to be disposed over a second cooling channel of the plurality of cooling channels to block airflow through the second cooling channel;
   a pivot structured to support a first side of the second plate;
   a fusible element structured to support a second side of the second plate and being structured to melt at a predetermined temperature,
   wherein when the first heat removal system is in the inactive state, the fusible element supports the second side of the second plate and the second plate blocks airflow through the second cooling channel, and wherein when the first heat removal system is in the active state, the fusible element melts and allows the second side of the second plate to fall into the cooling channel and allow airflow through the second cooling channel.

5. The nuclear reactor containment system of claim 1, wherein at least one of the air regulating mechanisms includes:
- a second plate structured to be disposed over a second cooling channel of the plurality of cooling channels to block airflow through the second cooling channel,
- wherein the second plate is comprised of a melting material,
- wherein when the first heat removal system is in the inactive state, the second plate blocks airflow through the second cooling channel, and
- wherein when the first heat removal system is in the active state, the second plate is structured to melt and allow airflow through the second cooling channel.

6. The nuclear reactor containment system of claim 1, wherein the at least one heat removal system includes a second heat removal system structured to dissipate heat to ground.

7. The nuclear reactor containment system of claim 6, wherein the second heat removal system includes:
- a primary chamber disposed in a bottom portion of the container, the primary chamber having a first material disposed therein; and
- a secondary chamber disposed above the primary chamber and around a perimeter of the container, the secondary chamber having a second material disposed therein,
- wherein the first material is a porous material having a higher melting point than the second material,
- wherein when the second heat removal system is in the inactive state, the second material does not melt, and
- wherein when the second heat removal system is in the active state, the second material melts and flows into the primary chamber.

8. The nuclear reactor containment system of claim 7, wherein the first material has a porosity in a range of about 30-80%.

9. The nuclear reactor containment system of claim 7, wherein the second material as at least one of chips, spheres, or powder in its solid state.

10. The nuclear reactor containment system of claim 6, further comprising:
- a heat spreader base plate in contact with a bottom surface of the container;
- a base area disposed below the container; and
- a number of heat conductive plates extending from the heat spreader base plate into the base area.

11. The nuclear reactor containment system of claim 10, wherein the base area is comprised of concrete.

12. The nuclear reactor containment system of claim 1, wherein the container has a substantially cylindrical shape and is comprised of a plurality of layers, the plurality of layers including:
- a neutron absorber layer;
- a gamma shield layer; and
- a container vessel wall.

13. The nuclear reactor containment system of claim 12, wherein the plurality of layers further includes:
- a neutron reflector layer.

14. The nuclear reactor containment system of claim 1, further comprising:
- an underground vault structured to receive the container, the underground vault including a recess to receive the container and a surrounding barrier area having a plurality of heat conductive plates formed therein.

15. The nuclear reactor containment system of claim 1, further comprising:
- a cask structured to receive the container; and
- a number of impact limiters structured to limit impacts to the container during transport.

16. The nuclear reactor containment system of claim 1, wherein a top portion of the container includes a lid having a lug, wherein the container is structured to be lifted via the lug.

17. A nuclear reactor containment system comprising:
- a nuclear reactor;
- a container enclosing the nuclear reactor, the container including:
  - at least one heat removal system having an active state and an inactive state, wherein the at least one heat removal system dissipates heat from the container more efficiently in the active state than in the inactive state, and wherein the at least one heat removal system is structured to switch from the inactive state to the active state based on a temperature of the container,
- wherein the at least one heat removal system includes a first heat removal system structured to dissipate heat to ground
- wherein the first heat removal system includes:
- a chamber disposed in a bottom portion of the container, the chamber having a top side, a bottom side, and sidewalls;
- a flexible liner disposed in the chamber, the flexible liner having a thermally conducting fluid disposed therein; and
- thermally expanding elements disposed on the sidewalls of the chamber, the thermally expanding elements being structured to expand inward and reduce an interior volume of the chamber as temperature rises,
- wherein when the first heat removal system is in the inactive state, the interior volume of the chamber is large enough that the flexible liner and thermally conducting fluid do not contact the top of the chamber, and
- wherein when the first heat removal system is in the active state, the thermally expanding elements expand and reduce the interior volume of the chamber such that the flexible liner and thermally conducting fluid are pressed upward to contact the top of the chamber.

* * * * *